United States Patent Office 3,529,363
Patented Sept. 22, 1970

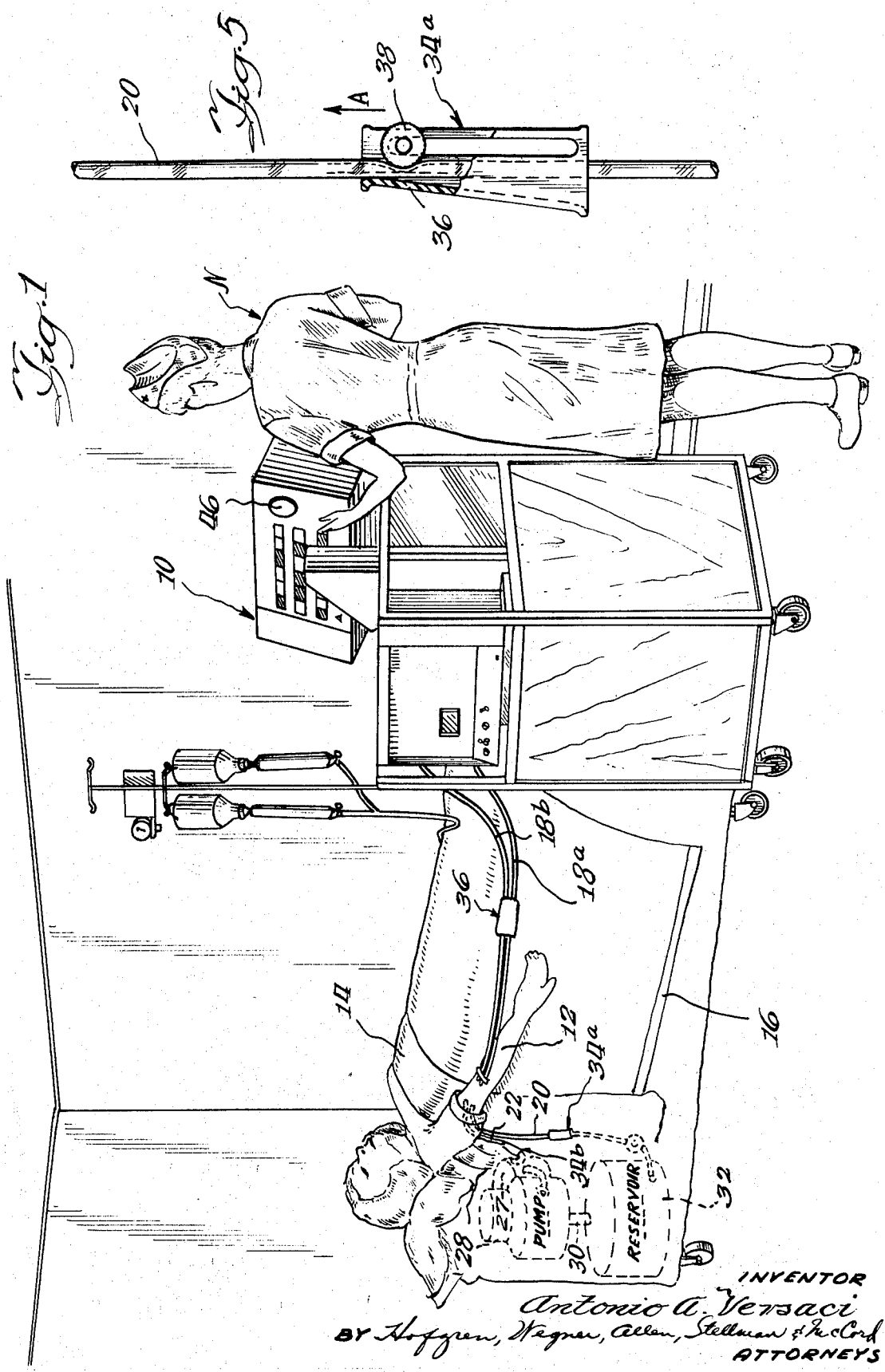

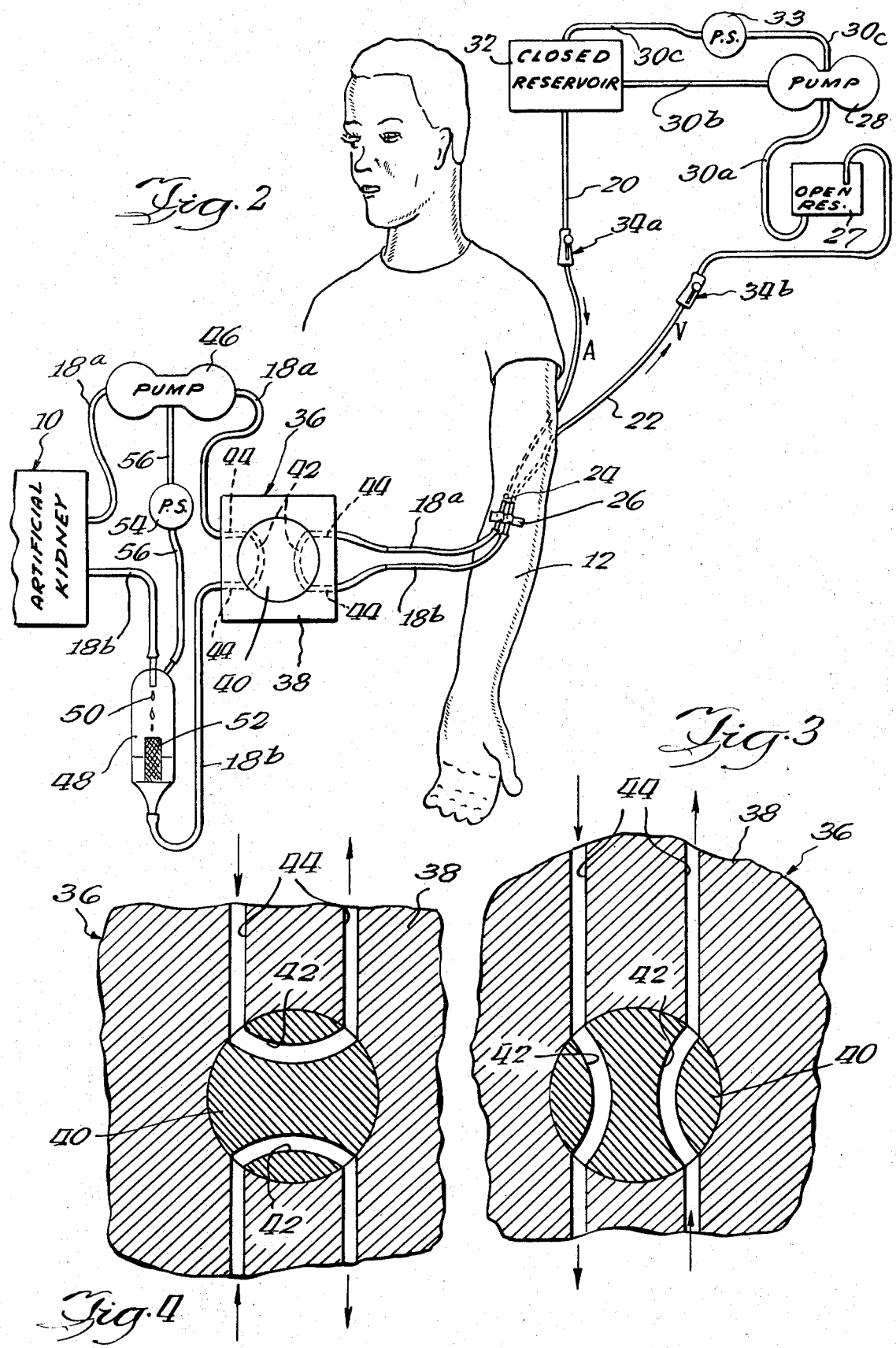

3,529,363
ARTIFICIAL KIDNEY TRAINING DEVICE
Antonio A. Versaci, 25 Wildwood Road,
Springfield, Ill. 62704
Filed Nov. 26, 1968, Ser. No. 779,111
Int. Cl. G09b 23/28
U.S. Cl. 35—17                                    12 Claims

ABSTRACT OF THE DISCLOSURE

A teaching device for use with an artificial kidney or the like, in which the device includes an artificial body member having conduit means which simulate an artery and a vein for receiving a blood simulating liquid. A pump is connected to the simulated artery and vein for imparting pressure to the liquid to represent arterial and venous flow of the liquid. Connections are made between the artery and vein and the artificial kidney. A throttle valve is connected in each of the artery and the vein conduits to represent malfunctions in the arterial or venous flow of liquid. A shunt means is provided to selectively direct the flow of liquid back toward the body member to disconnect the artificial kidney, and direct the flow of liquid back toward the artificial kidney to permit the artificial kidney to remain operative.

BACKGROUND OF THE INVENTION

At the present time, nurses or medical technicians who may supervise the operation of an artificial kidney are trained primarily by lecturers or by an opportunity to observe an artificial kidney in use with a live patient. They do not have an opportunity to work with the equipment until they actually use the equipment with a patient. There are various malfunctions in the arterial or venous flow of blood that can occur with an artificial kidney and which must be corrected by adjusting the apparatus. For instance, an artery may be unable to deliver enough blood due to an obstruction or the like. The pump of the artificial kidney might be over-pumping the actual supply of blood to the artery. In addition, there may be an obstruction or similar problem in the return of blood through the vein to the heart. It is highly desirable to have a teaching aid which would permit nurses, medical technicians and others to rehearse the correction procedures used with the artificial kidney should one or more of these malfunctions in the arterial or venous flow of blood occur. This invention is directed to providing such a teaching device.

SUMMARY OF THE INVENTION

The principal object of this invention is to provide a teaching device for use with an artificial kidney or the like to train students in the use of an artificial kidney.

Another object of this invention is to provide a training device of the character described in which means are provided to simulate malfunctions or obstructions in the arterial or venous flow of blood.

A further object of this invention is to provide a teaching device of the character described which includes an artificial body member having therein tubular conduits representing the vein and artery to which connections of the artificial kidney are made, and a heart simulating pump connected to the simulated artery and vein for imparting pressure to liquid therein to represent arterial and venous flow of blood. Throttle type valves are connected in each of the artery and vein conduits to represent an arterial malfunction which prevents the delivery of sufficient liquid to the artificial kidney, and to represent a venous malfunction on the return of liquid from the artificial kidney to the pump.

Still another object of this invention is to provide a teaching device as set forth in the preceding paragraph in which a shunt means is provided in the connections to the artificial kidney to direct the flow of liquid back toward the artificial body member and thereby render the artificial kidney ineffective.

Yet a further object of this invention is to provide a shunt means as set forth in the preceding paragraph in which the liquid is directed back toward the artificial kidney to permit the artificial kidney to remain operative.

DESCRIPTION OF THE DRAWINGS

FIG. 1 is a perspective view of a typical training area in which the teaching device of this invention may be employed, and illustrating a nurse at the controls of an artificial kidney which is operatively connected to the arm of an anatomical model to which the teaching device is operatively connected;

FIG. 2 is a schematic view showing the device of this invention operatively connected to the arm of an anatomical model;

FIG. 3 is a section through the shunt means of this invention in position to permit liquid to pass therethrough from a simulated artery and vein of the model to the artificial kidney;

FIG. 4 is a view similar to that of FIG. 3 with the shunt means positioned to direct the flow of liquid back to the artificial kidney and back to the simulated artery and vein; and FIG. 5 is a partial section through one of the throttle valves of the present invention.

DETAILED DESCRIPTION OF THE INVENTION

The invention is illustrated and described herein as a teaching aid for use with an artificial kidney. However, it is to be understood that the invention is equally applicable for use with other training devices in which the simulation of arterial and venous flow of blood and malfunctions or obstructions in such flow is useful.

FIG. 1 illustrates a typical training area in hospitals, schools and the like where the teaching device of this invention may be employed. An artificial kidney, generally designated 10, is shown in position to be operated or controlled by a medical technician or nurse N. The teaching device is shown in FIGS. 1 and 2 as adapted for use with an artificial body member, such as an arm 12, of an anatomical model 14. Referring to FIG. 1, the artificial kidney 10 may be positioned adjacent a bed 16 on which the model 14 is laid. Tubular connections 18a and 18b from the artificial kidney 10 are made to a simulated artery 20 and a simulated vein 22 extending through the artificial arm 12. The connections 18a and 18b and the simulated artery and vein 20 and 22, respectively, may comprise tubular plastic conduits. Referring to FIG. 2, the plastic tubes 20 and 22, which simulate the artery and vein of a patient, preferably extend through the artificial arm 12 and the ends of the plastic tubes are brought out of the arm as indicated at 24 and are tied down by a tape 26 or a cord, in accordance with usual medical practice. The plastic tubular connections 18a, 18b of the artificial kidney are made to the simulated artery 20 and vein 22.

The vein simulating plastic tube 22 leads to an open reservoir 27, through a plastic tube 30a to a heart simulating pulse pump 28, and through a plastic tube 30b to a closed reservoir 32. Reservoir 32 is connected to the artery simulating plastic tube 20 so that liquid in the artery and vein conduits is circulated as in the case with blood in an actual patient. The open reservoir 27 simulates the volume of blood in the venous system. The heart (pump 28) draws from the venous system, which has considerable volume. The closed reservoir 32 could be eliminated to give greater pulsations, but it is preferred so as to dampen excessive pulsations which may be produced with certain types of pumps. The resulting flow closely simulates a heart pumping action. A pressure switch 33 is connected by a plastic tube 30c between the pump 28 and the closed reservoir 32, parallel to tube 30b. The switch 33 is electrically connected to the pump 28 and is provided as a safety measure to shut the pump off at a predetermined excessive pressure, such as 300 mm. of mercury, and prevent rupturing the various components of the system.

Referring to FIGS. 1, 2 and 5, throttle valves, generally designated 34a and 34b, are connected in the artery and vein conduits 20 and 22, respectively. The throttle valves may take various forms to clamp the plastic tubes 20 and 22 with varying pressure to vary the rate of flow of liquid through the tubes, and to completely shut off the flow therethrough if desired. The embodiment shown in FIG. 5 comprises a roller type clamp which compresses the plastic tube 20 against a wall 36 of the clamp as the roller 38 is moved in the direction of arrow A. If it is desired to simulate the problem which occurs when an artery is unable to deliver enough blood and the heart simulating pump 28 is over-pumping the supply of blood through the artery simulating tube 20, the roller valve 34a is utilized to vary the rate of flow through the tube 20. If it is desired to provide a venous obstruction or a fault in the return of blood through the vein to the heart, the valve 34b is manipulated on the vein simulating tube 22 leading to the pump 28.

In order to permit a student to rehearse putting a patient on and off of the artificial kidney 10 in response to certain conditions presented by manipulation of the valves 34a and 34b, a shunt means, generally designated 36, is provided in communication with the connecting tubes 18a, 18b leading from the artificial arm 12 to the artificial kidney 10. The shunt 36 is constructed so that the flow of fluid may be selectively directed back toward the artificial arm 12 and thereby render the artificial kidney ineffective. In other words, the shunt 36 cuts the artificial kidney out of the circulation system. The shunt 36 also is constructed to direct the flow of liquid in the tubes 18a, 18b back toward the artificial kidney to permit the artificial kidney to remain operative even though it is cut out of the circulation system.

Referring to FIGS. 2 through 4, the shunt 36 shown herein comprises a solid body portion 38 which has a rotatable, cylindrical valve block 40 disposed therein. The valve block 40 has a pair of conduits extending therethrough with the four ends of the two conduits being equally spaced about the block 40. A pair of conduits 44 extend through the body portion 38 of the shunt and are spaced apart so as to mate with the ends of the conduits 42 of the block 40. The conduits 44 are adapted to receive the connecting tubes 18a and 18b leading to the artificial kidney. The valve block 40 is shown in FIG. 3 in position so that the artificial kidney 10 is connected in the circulation system so that the pump 28, artery conduit 20 and vein conduit 22 are in communication with the artificial kidney. FIG. 4 shows the valve block 40 rotated 90° to a position to shunt the flow of liquid back to the artificial kidney 10, and simultaneously shunt the flow of liquid back to the pump 28 through the artificial arm 12. Of course, the shunt 36 may be positioned in various places for control by the trainee. For instance, the shunt may be incorporated in the artificial kidney itself with a control knob 46 (FIG. 1) positioned to move the shunt to either of its positions shown in FIG. 3 or 4.

A pump 46 (FIG. 2) is connected in the tubular connection 18a, between the shunt 36 and the artificial kidney 10, and a drip tube 48 is connected in the tubular connection 18b, also between the shunt 36 and the artificial kidney. The drip tube 48 is of conventional construction and is provided to measure the rate of flow of blood through the system by counting the drops 50 of liquid during a particular period of time. The drip tube is provided with a filter 52. A second pressure switch 54 is connected by a tube 56 between the pump 46 and the drip tube 48 and is electrically connected to the pump to shut the pump off at excessive pressures.

The foregoing detailed description has been given for clearness of understanding only and no unnecessary limitations should be understood therefrom as some modifications will be obvious to those skilled in the art.

I claim:

1. For use with an artificial kidney or the like, a teaching device comprising conduit means simulating an artery and a vein for receiving a liquid simulating blood, means connecting the simulated artery and vein to the artificial kidney, a heart simulating pump means connected to the simulated artery and vein for imparting pressure to said liquid to represent arterial and venous flow of said liquid between the pump means and the artificial kidney, and valve means in at least one of the simulated artery or vein to represent a malfunction or obstruction in the simulated arterial or venous flow of said liquid.

2. The teaching device of claim 1 including a first valve means in said simulated artery to represent an arterial malfunction which prevents the delivery of sufficient liquid to the artificial kidney and a second valve means in said simulated vein to represent a venous malfunction on the return of liquid from the artificial kidney to the pump means.

3. The teaching device of claim 2 wherein said first and second valve means are throttle type valves to vary the rate of flow of said liquid through said simulated artery and vein and to block the flow therethrough if desired.

4. The teaching device of claim 2 wherein the conduit means which simulates the artery and the vein extends from the pump means through an artificial body member, the conduit means being exposed on one side of the body member for connection to the artificial kidney.

5. The teaching device of claim 4 including a shunt means in the connection means between the artificial body member and the artificial kidney, the shunt means having two positions, in one of which flow of said liquid is directed to the artificial kidney and in the other the flow is directed back to the body member.

6. The teaching device of claim 1 including a reservoir in communication with the conduit means which simulates said artery to damp pulsations created by said pump.

7. The teaching device of claim 6 wherein said reservoir is a closed reservoir.

8. The teaching device of claim 1 including a reservoir in communication with the conduit means which simulates said vein to simulate the volume of blood in the venous system, said pump means drawing liquid from said reservoir.

9. The teaching device of claim 7 wherein said reservoir is an open reservoir.

10. The teaching device of claim 1 including a pressure switch connected in said conduit means and electrically connected to said pump means to shut the pump means off at a predetermined pressure.

11. For use with an artificial kidney or the like, a teaching device comprising: conduit means simulating an artery and a vein for receiving a liquid simulating blood, means for connecting the simulated artery and vein to the artificial kidney, a hear simulating pump means connected to the simulated artery and vein for imparting pressure to said liquid to represent arterial and venous flow of said liquid between the pump means and the artificial kidney, means in at least one of said artery and vein to represent a malfunction or obstruction in the simulated arterial or venous flow of said liquid, and a shunt means connected to said artery and vein between said last-named means and said artificial kidney to direct the flow of said liquid back toward the pump means and thereby render the artificial kidney ineffective.

12. The teaching device of claim 11 wherein said shunt means has means to direct the flow of liquid back toward the artificial kidney when the liquid is directed back toward the body member to permit the artificial kidney to remain operative.

References Cited

UNITED STATES PATENTS

| | | | |
|---|---|---|---|
| 2,969,150 | 1/1961 | Broman | 210—321 |
| 2,995,832 | 8/1961 | Alderson | 35—17 |

HARLAND S. SKOGQUIST, Primary Examiner

U.S. Cl. X.R.

210—321